United States Patent
Haeberer

(10) Patent No.: US 9,057,305 B2
(45) Date of Patent: Jun. 16, 2015

(54) RESERVOIR TANK FOR A REDUCING AGENT

(75) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 572 days.

(21) Appl. No.: 13/511,191

(22) PCT Filed: Oct. 4, 2010

(86) PCT No.: PCT/EP2010/064702
§ 371 (c)(1),
(2), (4) Date: May 22, 2012

(87) PCT Pub. No.: WO2011/060994
PCT Pub. Date: May 26, 2011

(65) Prior Publication Data
US 2012/0237414 A1    Sep. 20, 2012

(30) Foreign Application Priority Data
Nov. 23, 2009 (DE) .......................... 10 2009 046 969

(51) Int. Cl.
*A61L 2/04* (2006.01)
*F01N 3/20* (2006.01)

(52) U.S. Cl.
CPC ........... *F01N 3/2066* (2013.01); *F01N 2610/02* (2013.01); *F01N 2610/10* (2013.01); *F01N 2610/1406* (2013.01); *Y02T 10/24* (2013.01)

(58) Field of Classification Search
CPC .......... F01N 3/2066; A61L 2/04; B01D 53/92
USPC ............. 422/307; 60/272, 282, 303; 220/564; 137/341
See application file for complete search history.

(56) References Cited

U.S. PATENT DOCUMENTS

2010/0025408 A1    2/2010    Haeberer et al.

FOREIGN PATENT DOCUMENTS

EP    2093397    8/2009

OTHER PUBLICATIONS

PCT/EP2010/064702 International Search Report dated Dec. 14, 2010 (Translation and Original, 4 pages).

*Primary Examiner* — Sean E Conley
(74) *Attorney, Agent, or Firm* — Michael Best & Friedrich LLP

(57) ABSTRACT

The invention relates to a reservoir tank for a reducing agent (1), in particular an aqueous urea solution for the after-treatment of exhaust gas from a combustion engine, comprising an outer container (2) and a pot-shaped inner container (3) which limits a partial volume (4) of the volume (5) of the outer container (2), a heating element (6) which is set in the inner container (3) and an extraction device (7) for extracting the reducing agent (1). According to the invention, the pot-shaped inner container (3) is surrounded in the floor region by an insulated collar (8) comprising a first limb (9) led to the outer circumferential surface (11) of the inner container (3) and a second limb (10) contacting the floor surface (12) of the outer container (2), such that the insulated collar (8) limits an additional partial volume (13) of the volume (5) of the outer container (2).

14 Claims, 1 Drawing Sheet

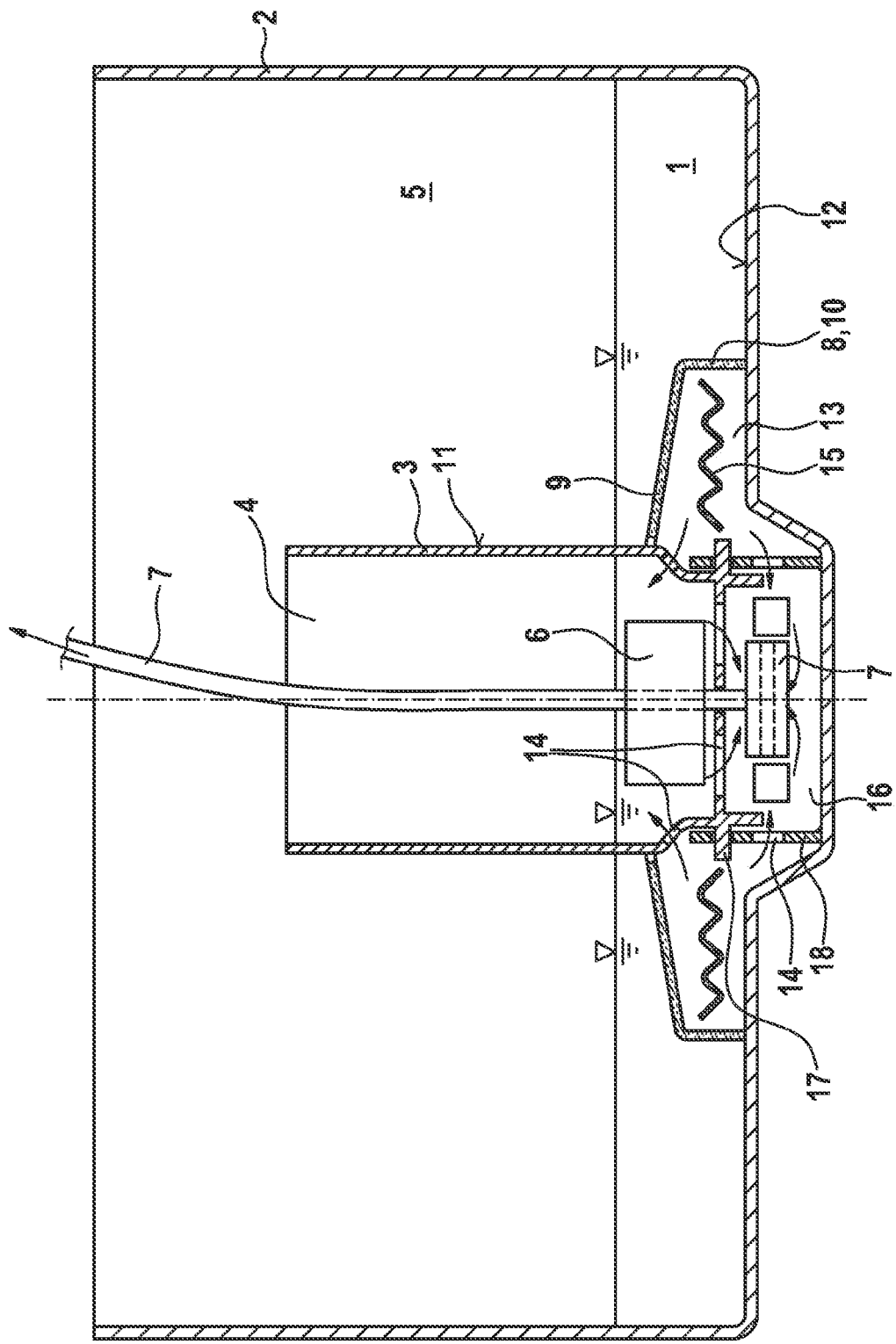

RESERVOIR TANK FOR A REDUCING AGENT

BACKGROUND OF THE INVENTION

The invention relates to a reservoir tank for a reducing agent, in particular an aqueous urea solution for the after-treatment of exhaust gas from a combustion engine, comprising an outer container and a pot-shaped inner container which limits a partial volume of the volume of the outer container, a heating element which is set in the inner container and an extraction device for extracting the reducing agent.

Due to steadily growing statutory requirements for the emission values of combustion engines, the exhaust gas from combustion engines is subjected to an after-treatment in order to comply with the predefined limits. In order to reduce the nitrogen oxide emissions, particularly in diesel engines, reduction catalysts are used by means of which the nitrogen oxide emissions (NOx) can be significantly lowered. Before the exhaust gas reaches the catalytic converter, a reducing agent is fed into said exhaust gas, as, for example, an aqueous urea solution. Said solution causes the formation of ammonia, which in turn reacts with the nitrogen oxides in the downstream catalytic converter to form harmless nitrogen and water. The supply of the aqueous urea solution takes place via metering systems, which as a rule comprise a reservoir tank for storing the reducing agent and a metering module as, for example, a metering pump or a metering valve. Such a metering system further requires a delivery module in order to supply the metering module with the reducing agent stored in the reservoir tank.

The reservoir tank provided for storing the reducing agent is normally disposed in the vehicle in such a way that the reducing agent contained therein is exposed to the outside temperatures. Because the aqueous urea solution freezes at temperatures below −11° C., the reservoir tank is equipped with a heating element, which prevents said solution from freezing or causes already frozen reducing agent to thaw. The heating element can, for example, relate to an electric heater. Self regulating PTC heating elements (Positive Temperature Coefficient), which are integrated into a flat carrier, can be used, for example, particularly advantageously at high temperatures as heating elements. Regardless of the precise embodiment of the heating element, said heating element is preferably disposed in the floor region of a pot-shaped container that is set in the tank, said container ensuring that said heating element is surrounded by a sufficient quantity of reducing agent even at a low fill level.

A reservoir tank of the aforementioned kind is known for example from the German patent application DE 10 2006 046 899 A1. The reservoir tank comprises an outer container, an inner container as well as a heating element, which is accommodated in the inner container. The reservoir tank further comprises an extraction device, with which the liquid reducing agent can be extracted from the tank. The inner container is thereby connected to the outer container in such a way that liquid reducing agent can flow out of said inner container into said outer container. The heating element, which is accommodated in said inner container, causes frozen reducing agent to thaw at low ambient air temperatures, which due to the fluidic connection between the two containers travels into said outer container and thereby causes the still frozen reducing agent contained therein to thaw. In order to fluidically connect said inner container to said outer container, the invention further proposes for said inner container to be provided with at least one aperture through which fluid can flow out of said outer container into said inner container and vice versa.

Because the frozen reducing agent has in comparison to the liquid reducing agent a considerably higher thermal conductivity, the liquid reducing agent leaving the inner container via the apertures causes the heat in the volume of ice in the outer container to be distributed or respectively reduced so that the heating element disposed in said inner container is only capable of thawing the frozen reducing agent present in said inner container. This result has a very critical effect on the motor vehicle's operation if the fill level is very low and/or the tank is very flat. The case can then arise where a sufficient quantity of liquid reducing agent is not available for the required exhaust gas after-treatment. The vehicle possibly has to then be shut down.

The aim of the invention is therefore to provide a reservoir tank for reducing agent of the kind previously mentioned, which facilitates an efficiency-optimized use of the heating element. The proposed reservoir tank shall additionally be able to have a flat construction.

SUMMARY OF THE INVENTION

The proposed reservoir tank has an outer container and a pot-shaped inner container, wherein the inner container limits a partial volume of the volume of the outer container. According to the invention, the pot-shaped inner container is surrounded in the floor region by an insulated collar comprising a first limb led to the outer circumferential surface of said inner container and a second limb contacting the floor surface of said outer container, such that the insulated collar limits an additional partial volume of the volume of said outer container. At outside temperatures below −11° C., the heating element disposed in said pot-shaped inner container initially causes the reducing agent to thaw which directly surrounds said heating element. The heat applied via said heating element is transmitted via the reducing agent contained in said inner container to the rest of the partial volume of said inner container; thus enabling the remaining frozen reducing agent contained therein to thaw. The reducing agent, which has become liquid again, travels from the first partial volume into the additional partial volume, which is limited by the insulated collar; thus enabling heat to be carried into the second partial volume via the already thawed reducing agent. The heat flow in the axial and radial direction is initially stopped by the insulated collar which limits the second partial volume. The insulated collar therefore prevents the heat emitted from the heating element from being released to the large tank side volume of ice in an uncontrolled manner. This is done because the ice volume in question would thereby be heated up only by a few degrees, would however not thaw.

Both of the partial volumes limited by the inner container and the insulated collar are fluidically connected to one another via axial and/or radial apertures so that the heat flow is promoted by already thawed reducing agent leaving the inner container.

In addition, both partial volumes are preferably centered in the horizontal direction and disposed in close proximity to the floor surface of the outer container in the vertical direction. The efficiency of the heating element is likewise increased by this measure because the heating element disposed in the inner container is surrounded by a sufficient quantity of frozen reducing agent even when the fill level of the reservoir tank is low. For that reason, the heating element is likewise preferably disposed in the floor region of the inner container. Because the floor region of said inner container is insulated by the circumferentially disposed insulated collar, the heat flow taking place via the wall of said inner container is also considerably reduced. The heating element preferably relates to an electric heater using PTC heating elements, which can be of flat construction and can accordingly be horizontally arranged in the floor region of said inner container.

The inner container and/or the insulated collar advantageously consist of a material which has a thermal conductivity lower than 0.5 W/(mK). The material is preferably a plastic material. At least the insulated collar thus has a thermal conductivity which is considerably lower than that of the frozen reducing agent. The inner container also advantageously consists of a corresponding material in order to reduce a transfer of heat from the inner container partial volume to the outer container volume.

In order to increase the heat flow in the partial volume, which is limited by the insulated collar, a modification to the invention provides for at least one heat conduction plate, which is preferably made of stainless steel, to be disposed in said partial volume. The thermal conductivity of a heat conduction plate made of stainless steel is approximately 14 W/(mK) so that the thermal conductivity lies considerably above the thermal conductivity of the insulated collar as well as that of the frozen reducing agent (thermal conductivity approximately between 2-3 W/(mk). Particularly in the case of a flat construction of the reservoir tank, the at least one heat conduction plate is preferably horizontally aligned in order to achieve an improved heat flow outwardly from the center. In order to evenly distribute the heat, a plurality of heat conduction plates is advantageously disposed in the horizontal position circumferentially around the inner container.

According to a preferred embodiment of the invention, a recess serving as a sump is configured in the floor surface of the outer container. The extraction device then also opens out into the sump. This ensures that liquid reducing agent is available in a sufficient quantity at the mouth opening of the extraction device even when the tank is in an angled position, when taking curves and/or when the fill level of the tank is low.

According to the invention, it is further proposed that the extraction device is a suction lance, the suction opening of which is positioned in close proximity to the floor of the outer container or respectively in the region of the sump—provided that one is present. The sump can be separated from the partial volume of the inner container by the floor surface of said inner container being arranged so as to be spaced apart from the floor surface of the outer container. In this case, the extraction device preferably opens out in the intermediate space limited by the two floor surfaces. To meet this end, the extraction device is led through an opening in the floor surface of the inner container.

In order to prevent the inner container from floating, said inner container is detachably connected to the outer container by means of a screw, plug, clamping and/or snap-on connection. In order to facilitate an applicable connection, the inner container is provided with a cylindrical extension on the floor thereof, which interacts with a receiving ring of the outer container, which is likewise arranged on the floor thereof, in such a way that a positively-locking connection is achieved. Such a connection can, for example, also be configured as a screw or snap-on connection similar to a bayonet connection. Also in this case, a cylindrical extension of the inner container and a receiving ring arranged near the floor of the outside container interact in a such a way that a positively-locking connection results. If a sump is provided, the receiving ring is preferably disposed within the sump and is welded to the floor surface thereof.

Reservoir tanks are known from prior art, the outer containers of which have only a small opening on the ceiling side for inserting the inner container and/or for inspection. In such a case, the insulated collar is embodied in a segmented manner in order to be segmentally inserted through the opening in the outer container. A connection of the individual segments then takes place after insertion into said outer container. The proposed type of assembly is particularly relevant for retrofitting already existing reservoir tanks The insulated collar proposed according to the invention can, for example, be provided as a separate component kit for retrofitting.

An additional external insulation of the outer container represents a further advantageous measure. The outer container is preferably at least partially thermally insulated from the outside in the floor region. The thermally insulated partial region is furthermore preferably centrally disposed and/or led around the sump.

All of the aforementioned measures contribute individually or in combinations to ensuring that even at low temperatures, liquid reducing agent is continually available in sufficient quantity for extraction and therefore for the exhaust gas after-treatment. This results from the fact that an unimpeded heat flow, which would only heat the ice up but not thaw it, is effectively prevented by the insulated collar or at least significantly reduced. A further advantage of the reservoir tank according to the invention is that the suction point is less sensitive to sloshing due to the insulating plate which fits closely to the floor surface of the outer container. This also contributes to ensuring that a sufficient quantity of liquid reducing agent is continually available at the suction point.

BRIEF DESCRIPTION OF THE DRAWING

A concrete exemplary embodiment of the present invention is subsequently described in detail with the aid of the one FIGURE. Said FIGURE shows a section through a reservoir tank according to the invention.

DETAILED DESCRIPTION

The reservoir tank depicted comprises an outer container 2 having a floor-side recess that is configured as a sump 16 as well as an inner container 3 which limits a partial volume 4 of the volume 5 of the outer container 2. The diagram shows the reservoir tank at a low fill level as a heating element 6 accommodated in the inner container 3 is only slightly covered by reducing agent 1. The partial volume 4 interacts with the volume 5 so that the fill level is the same in both containers 2, 3. The fill level or respectively the fill height is indicated with an arrow. An extraction device 7 in the form of a suction lance, which extends into the sump 16, is guided through the outer container 2 and the inner container 3. The sump 16 is limited above the suction opening of the suction lance by the floor of said inner container 3, wherein the floor has apertures 14 which fluidically connect the partial volume 4 of said inner container 3 to the volume 5 of said outer container 2 which extends into the sump. A lateral limitation is created by a receiving ring 18, which is welded to the floor surface 12 of the outer container 2, which likewise has apertures 14 to fluidically connect to the residual volume of the outer container 2. The receiving ring 18 welded to the floor surface 12 furthermore has apertures, in which detent noses of a cylindrical extension 17 to said inner container 3 engage in a locking manner. Said inner container 3 and said outer container 2 are thus connected in a positively-locking manner.

In order to reduce the radial and/or axial heat flow going out from the heating element 6 in the inner container 3 and as a result to achieve a better thawing effect, an insulated collar 8 is disposed around the inner container 3, said collar comprising at least one first limb 9 led very closely to the outer circumferential surface 11 of said inner container 3 and a second limb 10 contacting the floor surface 12 of the outer container 2. The insulated collar 8 therefore limits an additional partial volume 13 in said outer container 2, which extends around said inner container 3 and is fluidically connected to the partial volume 4 of said inner container 3 as well as to the volume 5 of said outer container 2. For this purpose, apertures 14 can, for example, likewise be configured in said insulated collar 8. As an alternative, the connection can be made via a negligible radial distance of said insulated collar 8 to said inner container 3. Due to said insulated collar 8 which is disposed outer circumferentially around said inner container 3, thawed, liquid reducing agent 1 travels out of the partial volume 4 of said inner container 3 initially into the partial volume 13, which is radially and axially limited by said insulated collar 8. Because said insulated collar 8 is made from a material, which has a low thermal conductivity, the radial and the axial heat flow are considerably reduced by said insulated collar 8. The heat input is therefore concentrated on the partial volume 4 of said inner container 3 and on the partial volume 13, thus ensuring that frozen reducing agent 1 present therein is thawed and is therefore available for the aftertreatment of exhaust gas. The remaining reducing agent present in volume 5 of said outer container 2 remains if need be frozen. A frozen layer of reducing agent remaining above said insulated collar 8 proves to be advantageous in certain circumstances. This is the case when the vehicle is cornering because said layer prevents already thawed liquid from being slung far to the outside and freezing there and thus being no longer available to the system.

A heat conduction plate 15 disposed in partial volume 13 and extending radially outwards from the inner container 3 can furthermore be seen in the diagram. The arrangement of such heat conduction plates 15 enhances the thawing effect in the partial volume 13 so that liquid reducing agent 1 is available in sufficient quantity in the sump 16 around the suction lance.

In order to achieve as flat a construction as possible of a reservoir tank according to the invention, the heating element 6 has preferably a flat design and is disposed in close proximity to the floor of the inner container 3. Provision is furthermore made for the insulated collar 8 to also have a preferably flat design which is achieved by the first limb 9 being configured longer than the second limb 10. The heat flow then takes place primarily in the radial direction; thus enabling a sufficient quantity of the reducing agent 1 to be thawed even when the fill level of the reservoir tank is low.

The insulated collar 8 of the illustrated embodiment limits a partial volume of approximately 2 liters. To this end, said insulated collar has a height of approximately 3 cm and an outside diameter of approximately 30 cm. The height of said insulated collar should preferably not exceed 4 cm in order to be suited for use in tanks of flat construction.

The invention claimed is:

1. A reservoir tank for a reducing agent (1), comprising an outer container (2) and a pot-shaped inner container (3) which limits a first partial volume (4) of a volume (5) of the outer container (2), a heating element (6) in the inner container (3) and an extraction device (7) for extracting the reducing agent (1), characterized in that the pot-shaped inner container (3) is surrounded in a floor region by an insulated collar (8) comprising a first limb (9) led to the outer circumferential surface (11) of said inner container (3) and a second limb (10) contacting a floor surface (12) of said outer container (2), such that the insulated collar (8) limits an additional second partial volume (13) of the volume (5) of said outer container (2).

2. The reservoir tank according to claim 1, characterized in that the first and second partial volumes (4, 13) are fluidically connected to one another.

3. The reservoir tank according to claim 1, characterized in that the first and second partial volumes (4, 13) are centered in the horizontal direction and disposed in the vertical direction in close proximity to the floor surface (12) of the outer container (2).

4. The reservoir tank according to claim 1, characterized in that at least one of the inner container (3) and the insulated collar (8) consists of a material which has a thermal conductivity <0.5 W/(mK).

5. The reservoir tank according to claim 1, characterized in that at least one heat conduction plate (15), is disposed in the partial volume (13) which is limited by the insulated collar (8).

6. The reservoir tank according to one of the previous claim 1, characterized in that a recess serving as a sump (16) is configured in the floor surface (12) of the outer container (2) and in that the extraction device (7) opens out into the sump (16).

7. The reservoir tank according to claim 1, characterized in that the extraction device (7) is a suction lance.

8. The reservoir tank according to claim 1, characterized in that the inner container (3) is detachably connected to the outer container (2), wherein a cylindrical extension (17) disposed on a floor of the inner container (3) preferably interacts with a receiving ring (18) disposed on the floor of the outer container (2).

9. The reservoir tank according to claim 1, characterized in that the insulated collar (8) is segmented.

10. The reservoir tank according to claim 1, characterized in that the outer container (2) is at least partially thermally insulated from the outside in the floor region.

11. The reservoir tank according to claim 1, characterized in that the first and second partial volumes (4, 13) are fluidically connected to one another via at least one of axial and radial apertures (14).

12. The reservoir tank according to claim 1, characterized in that at least one of the inner container (3) and the insulated collar (8) consist of a material which has a thermal conductivity <0.5 W/(mK), wherein said material is a plastic material.

13. The reservoir tank according to claim 1, characterized in that at least one heat conduction plate (15), which is made of stainless steel, is disposed in the partial volume (13) which is limited by the insulated collar (8).

14. The reservoir tank according to claim 1, characterized in that the inner container (3) is detachably connected to the outer container (2) by means of at least one of a screw, plug, clamping and snap-on connection, wherein a cylindrical extension (17) disposed on a floor of the inner container (3) interacts with a receiving ring (18) disposed on the floor of the outer container (2).

* * * * *